US012678821B2

(12) United States Patent
Wlodek

(10) Patent No.: US 12,678,821 B2
(45) Date of Patent: Jul. 14, 2026

(54) EPOXY AND CAULK PLUNGER BLOWOUT PREVENTER

(71) Applicant: Honeywell Federal Manufacturing & Technologies, LLC, Kansas City, MO (US)

(72) Inventor: Raphael Wlodek, Kansas City, MO (US)

(73) Assignee: Honeywell Federal Manufacturing & Technologies, LLC, Kansas City, MO (US)

( * ) Notice: Subject to any disclaimer, the term of this patent is extended or adjusted under 35 U.S.C. 154(b) by 217 days.

(21) Appl. No.: 18/517,246

(22) Filed: Nov. 22, 2023

(65) Prior Publication Data

US 2025/0161975 A1 May 22, 2025

(51) Int. Cl.
*B05C 17/01* (2006.01)
*B05C 17/005* (2006.01)

(52) U.S. Cl.
CPC .... *B05C 17/0123* (2013.01); *B05C 17/00576* (2013.01); *B05C 17/00596* (2013.01)

(58) Field of Classification Search
CPC .......... B05C 17/0123; B05C 17/00596; B05C 17/0116; B05C 17/012; B05C 17/00576
USPC .............................. 222/325–327, 386, 386.5
See application file for complete search history.

(56) References Cited

U.S. PATENT DOCUMENTS

| | | | | | |
|---|---|---|---|---|---|
| 2,833,451 | A * | 5/1958 | Sherbondy | G01F 11/026 222/327 | |
| 4,570,832 | A * | 2/1986 | Kroger | B05C 17/015 222/325 | |
| 4,907,727 | A * | 3/1990 | Ernst | B05C 17/00576 222/137 | |
| 5,735,825 | A | 4/1998 | Stevens et al. | | |
| 6,224,577 | B1 | 5/2001 | Dedola et al. | | |
| 9,827,376 | B2 | 11/2017 | Titus et al. | | |
| 10,493,209 | B2 | 12/2019 | Prasad et al. | | |

* cited by examiner

*Primary Examiner* — David J Walczak
(74) *Attorney, Agent, or Firm* — Hovey Williams LLP

(57) ABSTRACT

A plunger for engaging a plug of a cartridge used with a dispenser. The plunger broadly comprises a first section, a second section, and an intermediate section. The first section includes a first side surface and has a first diameter. The second section is forward of the first section so that the second section engages the plug ahead of the first section. The second section includes a second side surface and has a second diameter smaller than the first diameter. The intermediate section is between the first section and the second section and has a third side surface tapering from the first side surface to the second side surface so that the intermediate section urges an annular wall of the plug radially outward against the cartridge thereby forming a seal between the annular wall and the cartridge when the plunger is urged longitudinally toward the plug.

20 Claims, 3 Drawing Sheets

EPOXY AND CAULK PLUNGER BLOWOUT PREVENTER

GOVERNMENT INTERESTS

This invention was made with Government support under Contract No.: DE-NA-0002839 awarded by the United States Department of Energy/National Nuclear Security Administration. The Government has certain rights in the invention.

BACKGROUND

High pressure dispensers are often used to mete out epoxy, caulk, and other viscous materials from a cartridge by pressing a plunger against an actuatable plug of the cartridge. Unfortunately, pressing the plunger against the plug often compromises a seal between the plug and an outer wall of the cartridge, thus allowing some of the material to undesirably eject out of the cartridge past the plug.

SUMMARY OF THE INVENTION

Embodiments of the present invention solve the above-mentioned problems and other problems and provide a distinct advance in the art of high pressure dispensers. More particularly, the present invention provides a plunger that presses against a plug of a cartridge while maintaining or improving integrity of a seal between the plug and an outer wall of the cartridge to prevent unintentional ejection of material past the plug.

An embodiment is a plunger of a high pressure dispenser for engaging a plug of a cartridge. The plunger broadly comprises a first section, a relatively narrower second section, and an intermediate section between the first section and second section.

The first section includes a first side surface and has a first diameter. The second section is forward of the first section so that the second section engages the plug ahead of the first section. The second section includes a second side surface and has a second diameter smaller than the first diameter.

The intermediate section has a third side surface tapering from the first side surface to the second side surface so that the intermediate section urges the annular wall radially outward against the cartridge thereby forming a seal between the annular wall and the cartridge when the plunger is urged longitudinally toward the plug.

Another embodiment of the invention is a high pressure dispenser for use with a cartridge having a plug. The high pressure dispenser broadly comprises a body, a cartridge retainer, a pushrod, and a plunger.

The body supports the cartridge retainer and the pushrod. The cartridge retainer is configured to be connected to (and disconnected from) the body and forms a chamber configured to receive the cartridge therein. The cartridge retainer also forms an aperture at its distal end. Alternatively, an open caulk gun dispenser may be used.

The pushrod is configured to slide relative to the body into the cartridge retainer toward the distal aperture and has a distal end to which the plunger is connected.

The plunger is positioned at the distal end of the pushrod and broadly comprises a first section, a relatively narrower second section, and an intermediate section between the first section and second section.

The first section includes a first side surface and has a first diameter. The second section is forward of the first section so that the second section engages the plug ahead of the first section. The second section includes a second side surface and has a second diameter smaller than the first diameter.

The intermediate section has a third side surface tapering from the first side surface to the second side surface so that the intermediate section urges the annular wall radially outward against the cartridge thereby forming a seal between the annular wall and the cartridge when the plunger is urged longitudinally toward the plug.

Yet another embodiment of the invention is a high pressure dispenser for use with a cartridge having a plug. The high pressure dispenser broadly comprises a body, a cartridge retainer, a pushrod, and a plunger.

The body supports the cartridge retainer and the pushrod and includes opposing molded shells fastened together. The cartridge retainer is configured to be connected to (and disconnected from) the body and forms a chamber configured to receive the cartridge therein. The cartridge retainer also forms an aperture at its distal end. The cartridge retainer is formed of metal.

The pushrod is configured to slide relative to the body into the cartridge retainer toward the distal aperture and has a distal end to which the plunger is connected.

The plunger is positioned at the distal end of the pushrod and broadly comprises a first section, a relatively narrower second section, and an intermediate section between the first section and second section.

The first section includes a first side surface and has a first diameter. The second section is forward of the first section so that the second section engages the plug ahead of the first section. The second section includes a second side surface and has a second diameter smaller than the first diameter. The second section and first section have approximately equal longitudinal thicknesses.

The intermediate section has a third side surface tapering from the first side surface to the second side surface at approximately 45 degrees from a longitudinal axis of the plunger so that the intermediate section urges the annular wall radially outward against the cartridge thereby forming a seal between the annular wall and the cartridge when the plunger is urged longitudinally toward the plug. The intermediate section has a longitudinal thickness smaller than the longitudinal thicknesses of the first section and second section.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the current invention will be apparent from the following detailed description of the embodiments and the accompanying drawing figures.

BRIEF DESCRIPTION OF THE DRAWING FIGURES

Embodiments of the present invention are described in detail below with reference to the attached drawing figures, wherein.

Figure 1:
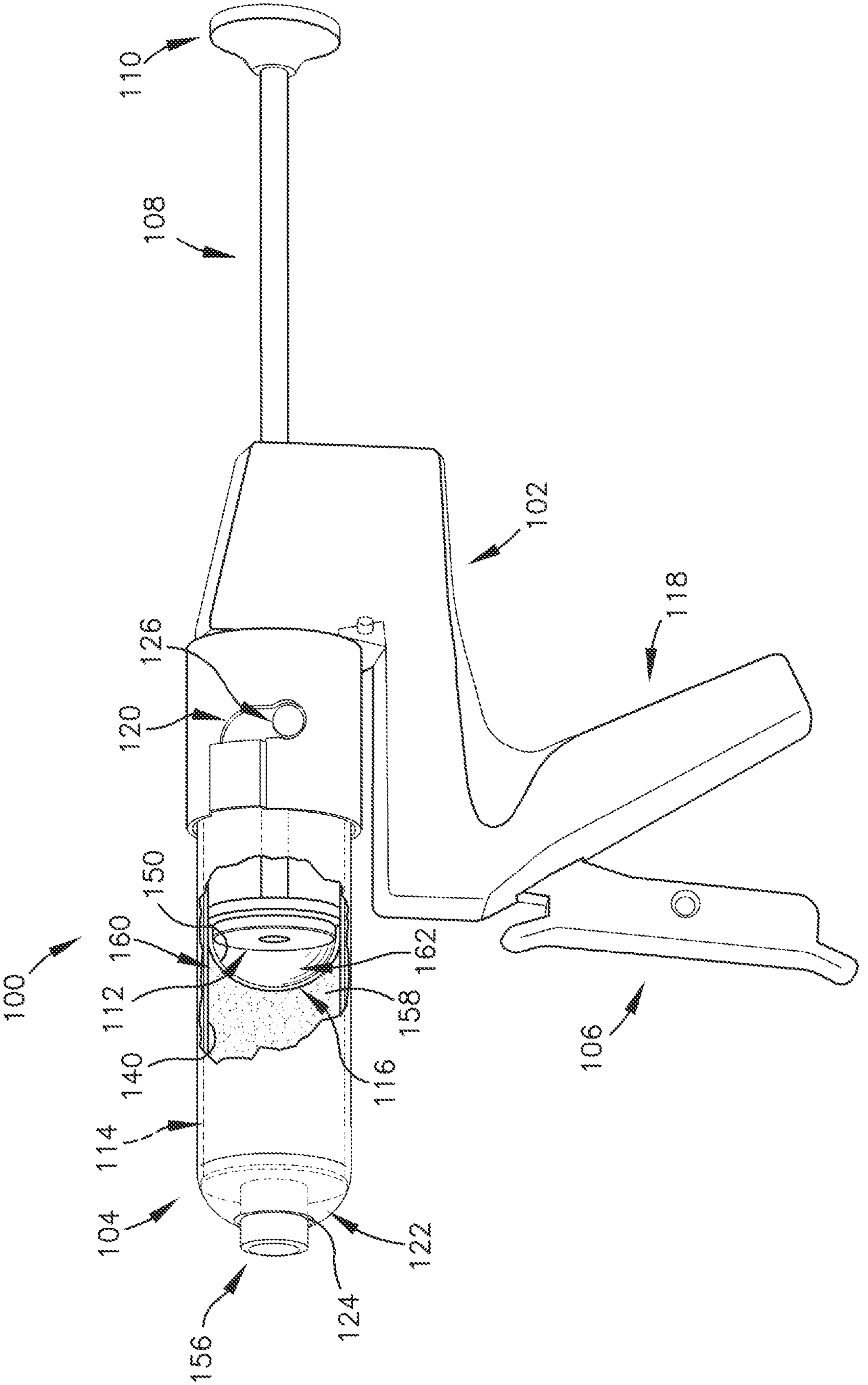
FIG. 1 is a perspective view of a high pressure dispenser constructed in accordance with an embodiment of the invention.

The drawing figures do not limit the current invention to the specific embodiments disclosed and described herein. The drawings are not necessarily to scale, emphasis instead being placed upon clearly illustrating the principles of the invention.

DETAILED DESCRIPTION OF THE EMBODIMENTS

Turning to FIG. 1, a high pressure dispenser 100 constructed in accordance with an embodiment of the invention is illustrated. The high pressure dispenser 100 broadly comprises a body 102, a cartridge retainer 104, a lever 106, a pushrod 108, a handle 110, and a plunger 112. The high pressure dispenser 100 may be used to dispense epoxy, caulk, or other viscous material from a cartridge 114 having an actuatable plug 116.

The body 102 retains the pushrod 108, lever 106, and cartridge retainer 104 in working engagement with each other and may include a hand grip 118. The body 102 may be formed via molding, machining, additive manufacturing, or any other suitable means of construction. In one embodiment, the body 102 is formed of two shells mated or fastened together. The body 102 may also include open-ended slots 120 configured to receive anchors (described below) of the cartridge retainer 104. The slots 120 may have a curvature that entrains the anchors therein when pressure is applied to the cartridge retainer 104.

The cartridge retainer 104 secures the cartridge 114 against the body 102 in response to pressure from the plunger 112 and has an open-ended cavity 122 and a tip opening 124 near its distal (forward) end. The cartridge retainer 104 may have a shape similar to a shape of the cartridge 114. For example, the cartridge retainer 104 may be substantially cylindrical with its distal end being dome-shaped. The cartridge retainer 104 may be formed of metal or other material that does not bend under high loads. The cartridge retainer 104 may include anchors 126 configured to be inserted into the slots 120 of the body 102 as described above.

The lever 106 may be pivotably or translatably linked to the body 102 and configured to directly or indirectly engage the pushrod 108 so that squeezing the lever 106 toward the hand grip 118 results in the lever 106 advancing the pushrod 108 toward the cartridge retainer 104. The lever 106 may have a ratcheting mechanism or may be configured to undertake a ratcheting movement so that the pushrod 108 does not retract when the lever 106 is released and so that subsequent squeezes of the lever 106 results in further advancement of the pushrod 108 toward the cartridge retainer 104.

The pushrod 108 is slidably entrained with the body 102 and configured to be engaged directly or indirectly by the lever 106 for urging the plunger 112 toward the cartridge 114. To that end, the pushrod 108 may be elongated and cylindrical. In one embodiment, the pushrod 108 is smooth, but in another embodiment the pushrod 108 may include teeth or other geometry for being actuated by the lever 106.

The handle 110 is positioned near a distal (rear) end of the pushrod 108. The handle 110 may be gripped for retracting the pushrod 108 away from the cartridge 114 (e.g., for resetting the high pressure dispenser 100). In one embodiment, the handle is spherical. In another embodiment, the handle has gripping geometry.

The plunger 112 is positioned near a proximal end of the pushrod (opposite the handle). As best seen in FIGS. 2-5, the plunger 112 broadly comprises a first section 128, a second section 130, and an intermediate section 132. As seen in FIG. 1, the plunger 112 is configured to engage the plug 116 as described in more detail below.

Turning again to FIGS. 2-5 and with reference to FIG. 1, the first section 128 is aft of the second section 130 and the intermediate section 132 and adjacent to the intermediate section 132. The first section 128 includes a side surface 134 forming a convex edge 136 with a side surface of the intermediate section 132. The first section 128 also includes a rear surface 138. A diameter of the side surface 134 (and hence the first section 128) may be greater than a diameter of the second section 130. The diameter of the side surface 134 may be substantially equal to (or slightly less than) an inner diameter of an outer wall 140 of the cartridge 114 so that the first section 128 abuts the outer wall 140 of the cartridge 114 when inserted into the inner space 160 formed by the cartridge 114 behind the plug 116. The first section 128 may be substantially cylindrical to match a shape of the outer wall 140 of the cartridge 114. In one embodiment, the first section 128 is omitted so that the intermediate section 132 is a forwardmost section.

The second section 130 is forward of the first section 128 and the intermediate section 132 and adjacent to the intermediate section 132 opposite the first section 128. The second section 130 includes a side surface 142 forming a concave edge 144 with the side surface of the intermediate section 132. The second section 130 also includes a forward surface 146 forming an annular edge 148 with the side surface 142. The annular edge 148 may be a straight edge or may be filleted or chamfered for aiding insertion of the plunger 112 into the plug 116. A diameter of the side surface 142 (and hence the second section 130) may be smaller than the diameter of the side surface 134 of the first section 128. The diameter of the side surface 142 of the second section 130 may be substantially equal to (or slightly less than) an inner diameter of an annular wall 150 of the plug 116 so that the second section 130 abuts the annular wall 150 of the plug 116 when inserted into a space 162 formed by the plug 116. The second section 130 may be substantially cylindrical to match a shape of the annular wall 150 of the plug 116.

The intermediate section 132 extends between the first section 128 and the second section 130 and has a side surface 152 tapered to match the diameters of the first section 128 and second section 130. In one embodiment, the side surface 152 of the intermediate section 132 has a taper between approximately 30 degrees (from a longitudinal axis of the plunger 112) and approximately 60 degrees (from the longitudinal axis of the plunger 112). In another embodiment, the side surface 152 has a taper of approximately 45 degrees from the longitudinal axis of the plunger 112. The side surface 152 heretofore has been described as having a linear taper, but other taper profiles such as sinusoidal, parabolic, arcuate, or a combination of tapers may be used. To that end, the edges 136, 144 may be straight edges or may be filleted or chamfered.

Figure 2:
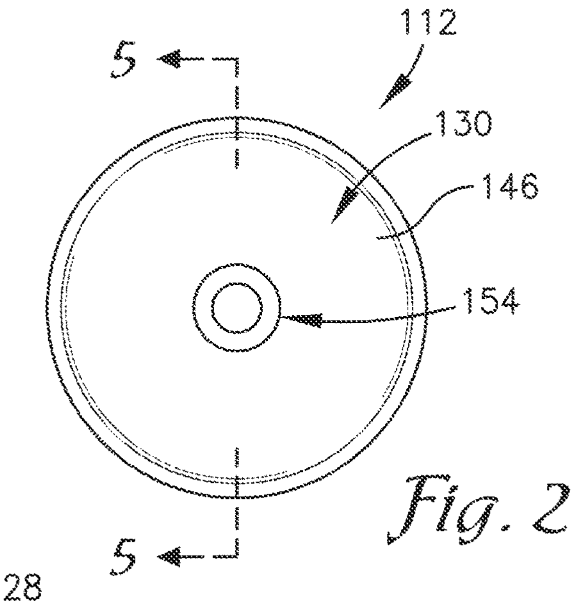
FIG. 2 is a front elevation view of a plunger of the high pressure dispenser of FIG. 1
Figure 3:
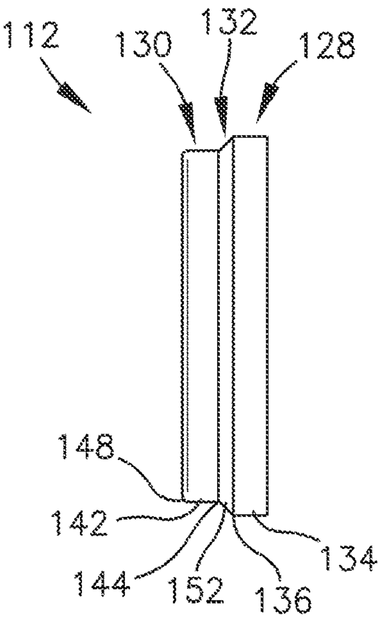
FIG. 3 is a side elevation view of the plunger of FIG. 2.
Figure 4:
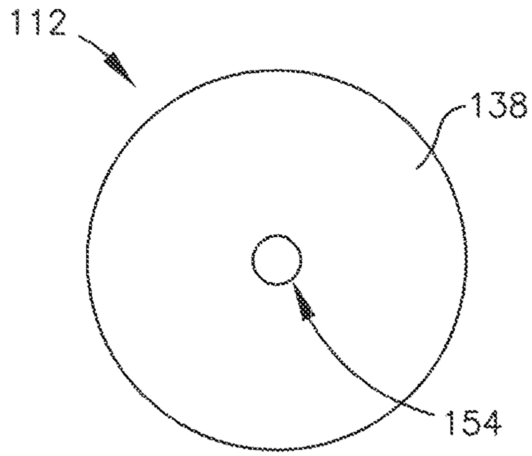
FIG. 4 is a rear elevation view of the plunger of FIG. 2.
Figure 5:
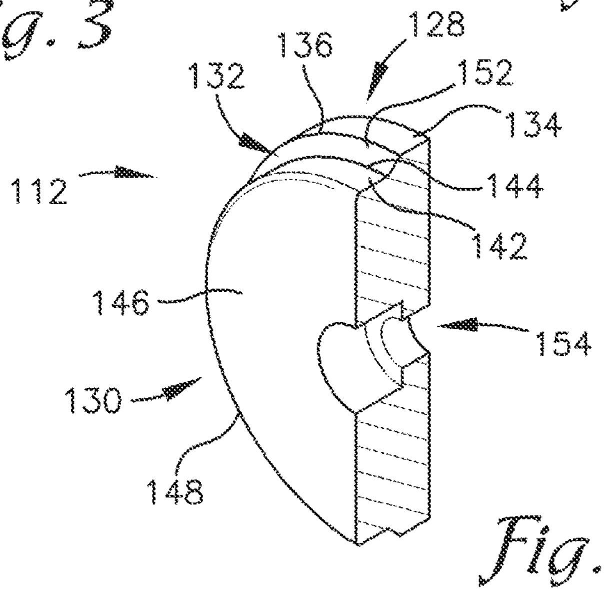
FIG. 5 is a cutaway perspective view of the plunger of FIG. 2.
Figure 6:
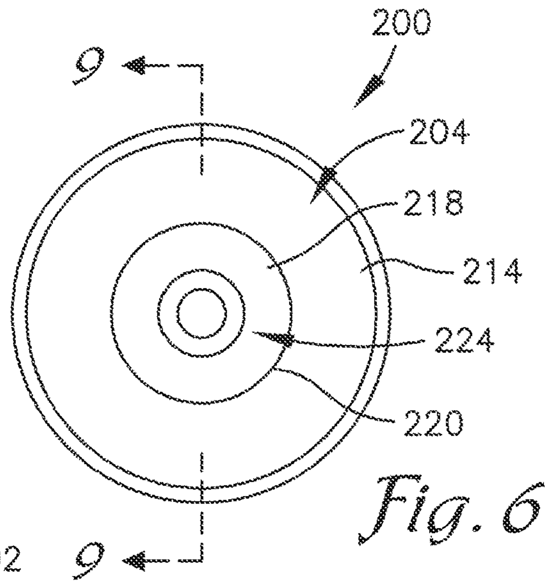
FIG. 6 is a front elevation view of a plunger constructed in accordance with another embodiment of the invention.
Figure 7:
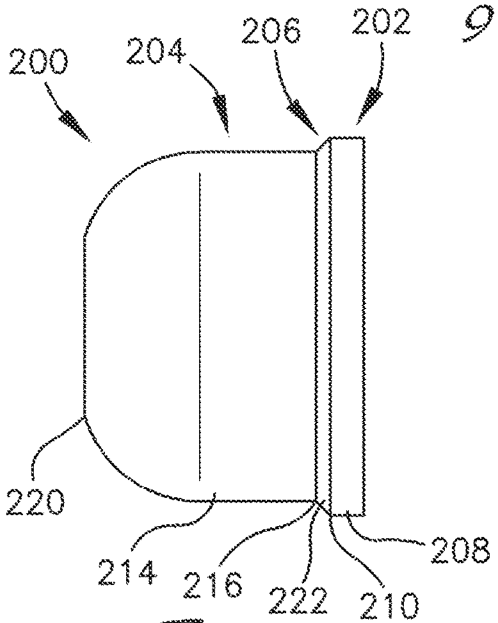
FIG. 7 is a side elevation view of the plunger of FIG. 6.
Figure 8:
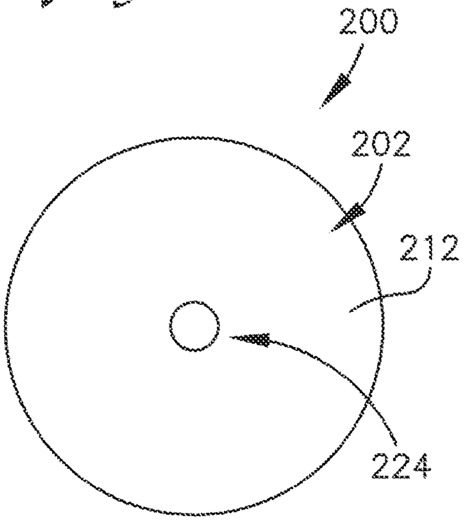
FIG. 8 is a rear elevation view of the plunger of FIG. 6.
Figure 9:
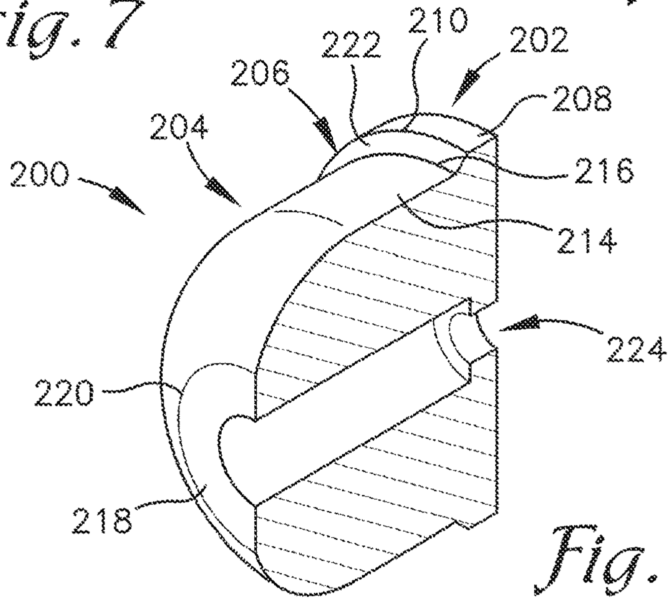
FIG. 9 is a cutaway perspective view of the plunger of FIG. 6.

As seen in FIGS. 2, 4, and 5, the plunger 112 may include a through-hole 154 extending from the rear surface 138 to the forward surface 146 for connecting the plunger 112 to the pushrod 108. The through-hole 154 may be countersunk (from the forward surface 146 of the second section 130) for receiving a nut or other fastener securing the plunger 112 to the pushrod 108.

Use of the high pressure dispenser 100 will now be described in more detail. First, the cartridge retainer 104 may be separated from the body 102. This may require the cartridge retainer 104 to be rotated about its longitudinal axis to free the anchors 126 from the slots 120 and then moved forward relative to the body 102. The cartridge 114 may then be inserted into the cartridge retainer 104 so that a dispensing tip 156 of the cartridge 114 protrudes from the tip opening 124. The handle 110 may then be pulled rearward to retract the pushrod 108 and hence the plunger 112. The cartridge retainer 104 may then be re-connected to the body 102. This can be achieved by aligning the anchors 126 with the slots 120, moving the cartridge retainer 104 rearward so that the anchors 126 enter the slots 120, and then rotating the cartridge retainer 104 about its longitudinal axis until the anchors 126 are seated in the curved portion of the slots 120.

The pushrod 108 may then be advanced forward into the space 160 formed by the cartridge 114 via repeated actuation of the lever 106 (alternatively via an electric drive, a pneumatic drive, or even a hydraulic drive) until the plunger 112 engages the plug 116 of the cartridge 114. Specifically, the second section 130 will enter the space 162 formed by the plug 116 so that the side surface 142 of the second section 130 abuts the annular wall 150 of the plug 116. A cap of the cartridge 114 may then be removed (or a sacrificial tip may be cut) from the cartridge 114 to reveal or form an opening in the cartridge 114 from which material will be dispensed. Alternatively a dispensing tip may be attached to the cartridge 114.

The pushrod 108 may then be further advanced via the lever 106 so that the plunger 112 pushes the plug 116 further into the cartridge 114, thereby pressuring material 158 (i.e., epoxy, caulk, or the like) out of the opening formed in the cartridge 114. To that end, the intermediate section 132 engages the annular wall 150 of the plug 116 to impart a longitudinal force and a radial force on the plug 116. Specifically, as the tapered surface 152 contacts with the annular wall 150 of the plug 116, the tapered surface 152 also presses the annular wall 150 of the plug 116 radially outward against the outer wall 140 of the cartridge 114. This prevents material from leaking or blowing out between the plug 116 and the outer wall 140 of the cartridge 114.

Turning to FIGS. 6-9, a plunger 200 constructed in accordance with another embodiment of the invention will now be described. The plunger 200 broadly comprises a first section 202, a second section 204, and an intermediate section 206. The plunger 200 is similar to the plunger 112 described above except the second section 204 is more prominent as described below.

The first section 202 is aft of the second section 204 and the intermediate section 206 and adjacent to the intermediate section 206. The first section 202 includes a side surface 208 forming a convex edge 210 with a side surface of the intermediate section 206. The first section 202 also includes a rear surface 212. A diameter of the side surface 208 (and hence the first section 202) may be greater than a diameter of the second section 204. The diameter of the side surface 208 may be substantially equal to (or slightly less than) an inner diameter of an outer wall of a cartridge so that the first section 202 abuts the outer wall of the cartridge when inserted into an inner space formed by the cartridge. The first section 202 may be substantially cylindrical to match a shape of the outer wall of the cartridge.

The second section 204 is forward of the first section 202 and the intermediate section 206 and adjacent to the intermediate section 206 opposite the first section 202. The second section 204 includes a side surface 214 forming a concave edge 216 with the side surface of the intermediate section 206. The second section 204 also includes a forward surface 218 forming an annular edge 220 with the side surface 214. The annular edge 220 may be a straight edge or may be filleted or chamfered for aiding insertion of the plunger 200 into a plug. A diameter of the side surface 214 (and hence the second section 204) may be smaller than the diameter of the side surface 208 of the first section 202. The diameter of the side surface 214 of the second section 204 may be substantially equal to (or slightly less than) an inner diameter of an annular wall of the plug so that the second section 204 abuts the annular wall of the plug when inserted into the inner space formed by the plug. The second section 204 may have a dome shape to match a shape of the plug. To that end, the second section 204 may have a longitudinal thickness substantially greater than a longitudinal thickness of the first section.

The intermediate section 206 extends between the first section 202 and the second section 204 and has a side surface 222 tapered to match the diameters of the first section 202 and second section 204. In one embodiment, the side surface 222 of the intermediate section 206 has a taper between approximately 30 degrees (from a longitudinal axis of the plunger 200) and approximately 60 degrees (from the longitudinal axis of the plunger 200). In another embodiment, the side surface 222 has a taper of approximately 45 degrees from the longitudinal axis of the plunger 200. The side surface 222 heretofore has been described as having a linear taper, but other taper profiles such as sinusoidal, parabolic, arcuate, or a combination of tapers may be used. To that end, the edges 210, 216 may be straight edges or may be filleted or chamfered.

The plunger 200 may include a through-hole 224 extending from the rear surface 212 to the forward surface 218 for connecting the plunger 200 to a pushrod. The through-hole 224 may be countersunk (from the forward surface 218 of the second section 204) for receiving a nut or other fastener securing the plunger 200 to the pushrod.

ADDITIONAL CONSIDERATIONS

This description references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the present invention. This description is, therefore, not to be taken in a limiting sense. The scope of the present invention is defined only by the appended claims, along with the full scope of equivalents to which such claims are entitled.

In this description, references to “one embodiment”, “an embodiment”, or “embodiments” mean that the feature or features being referred to are included in at least one embodiment of the technology. Separate references to “one embodiment”, “an embodiment”, or “embodiments” in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the current technology can include a variety of combinations and/or integrations of the embodiments described herein.

Throughout this specification, plural instances may implement components, operations, or structures described as a single instance. Although individual operations of one or more methods may be illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

As used herein, the terms “comprises,” “comprising,” “includes,” “including,” “has,” “having” or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus.

The patent claims at the end of this patent application are not intended to be construed under 35 U.S.C. § 110(f) unless traditional means-plus-function language is expressly recited, such as “means for” or “step for” language being explicitly recited in the claim(s).

Although the invention has been described with reference to the embodiments illustrated in the attached drawing figures, it is noted that equivalents may be employed and substitutions made herein without departing from the scope of the invention as recited in the claims.

Having thus described various embodiments of the invention, what is claimed as new and desired to be protected by Letters Patent includes the following:

1. A plunger for engaging a plug of a cartridge used with a dispenser, the plug including an annular wall, the plunger comprising:
- a first section including a first side surface and having a first diameter, the first diameter being a maximum diameter of the plunger;
- a second section forward of the first section so that the second section is configured to engage the plug ahead of the first section, the second section including a second side surface and having a second diameter smaller than the first diameter; and
- an intermediate section between the first section and the second section, the intermediate section having a third side surface tapering from the first side surface to the second side surface such that a maximum diameter of the intermediate section is equal to the first diameter so that the intermediate section is configured to urge the annular wall radially outward against the cartridge thereby forming a seal between the annular wall and the cartridge when the plunger is urged longitudinally toward the plug.

2. The plunger of claim 1, the third side surface of the intermediate section tapering at an angle of between 30 degrees and 60 degrees from a longitudinal axis of the plunger.

3. The plunger of claim 1, the third side surface of the intermediate section tapering at an angle of 45 degrees from a longitudinal axis of the plunger.

4. The plunger of claim 1, each of the first section and the second section being cylindrical.

5. The plunger of claim 1, wherein the second section has a dome shape.

6. The plunger of claim 5, wherein the second section has a flat forward surface.

7. The plunger of claim 1, wherein a longitudinal thickness of the intermediate section is less than a longitudinal thickness of the first section and the second section.

8. The plunger of claim 1, wherein a longitudinal thickness of the first section is equal to a longitudinal thickness of the second section.

9. The plunger of claim 1, wherein a longitudinal thickness of the second section is greater than a longitudinal thickness of the first section.

10. The plunger of claim 1, the second section further including a forward surface and forming an annular filleted edge between the second side surface and the forward surface.

11. A dispenser for use with a cartridge having a plug, the plug including an annular wall, the dispenser comprising:
- a body;
- a cartridge retainer configured to be connected to the body, the cartridge retainer forming a chamber configured to receive the cartridge therein, and a distal aperture;
- a pushrod configured to slide relative to the body into the cartridge retainer toward the distal aperture, the pushrod having a distal end; and
- a plunger positioned at the distal end of the pushrod, the plunger comprising:
- a first section including a first side surface and having a first diameter, the first diameter being a maximum diameter of the plunger;
- a second section forward of the first section so that the second section is configured to engage the plug ahead of the first section, the second section including a second side surface and having a second diameter smaller than the first diameter; and
- an intermediate section between the first section and the second section, the intermediate section having a third side surface tapering from the first side surface to the second side surface such that a maximum diameter of the intermediate section is equal to the first diameter so that the intermediate section is configured to urge the annular wall radially outward against the cartridge thereby forming a seal between the annular wall and the cartridge when the plunger is urged longitudinally toward the plug via the pushrod.

12. The dispenser of claim 11, the third side surface of the intermediate section tapering at an angle of between 30 degrees and 60 degrees from a longitudinal axis of the plunger.

13. The dispenser of claim 11, the third side surface of the intermediate section tapering at an angle of 45 degrees from a longitudinal axis of the plunger.

14. The dispenser of claim 11, each of the first section and the second section being cylindrical.

15. The dispenser of claim 11, wherein the second section has a dome shape.

16. The dispenser of claim 11, wherein a longitudinal thickness of the intermediate section is less than a longitudinal thickness of the first section and the second section.

17. The dispenser of claim 11, wherein a longitudinal thickness of the first section is equal to a longitudinal thickness of the second section.

18. The dispenser of claim 11, wherein a longitudinal thickness of the second section is greater than a longitudinal thickness of the first section.

19. The dispenser of claim 11, the second section further including a forward surface and forming an annular filleted edge between the second side surface and the forward surface.

20. A dispenser for use with a cartridge having a plug, the plug including an annular wall, the dispenser comprising:

a body including opposing molded shells mated together;

a metal cartridge retainer configured to be connected to the body, the cartridge retainer forming a chamber configured to receive the cartridge therein, and a distal aperture;

a pushrod configured to slide relative to the body into the cartridge retainer toward the distal aperture, the pushrod having a distal end; and a plunger positioned at the distal end of the pushrod, the plunger comprising:

a first section including a first side surface and having a first diameter, the first diameter being a maximum diameter of the plunger;

a second section forward of the first section so that the second section is configured to engage the plug ahead of the first section, the second section including a second side surface and having a second diameter smaller than the first diameter, the second section and the first section having equal longitudinal thicknesses; and an intermediate section between the first section and the second section, the intermediate section having a third side surface tapering from the first side surface to the second side surface at 45 degrees from a longitudinal axis such that a maximum diameter of the intermediate section is equal to the first diameter so that the intermediate section is configured to urge the annular wall radially outward against the cartridge thereby forming a seal between the annular wall and the cartridge when the plunger is urged longitudinally toward the plug via the pushrod, the intermediate section having a longitudinal thickness smaller than the longitudinal thicknesses of the first section and second section.

* * * * *